(12) United States Patent
Ramprasad

(10) Patent No.: US 9,979,834 B2
(45) Date of Patent: *May 22, 2018

(54) WIRELESS ACCESS POINT HAVING METERING CAPABILITY AND METERING DISPLAY

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/672,576

(22) Filed: Aug. 9, 2017

(65) Prior Publication Data

US 2017/0339281 A1 Nov. 23, 2017

Related U.S. Application Data

(63) Continuation of application No. 14/942,382, filed on Nov. 16, 2015, now Pat. No. 9,736,320.

(60) Provisional application No. 62/079,828, filed on Nov. 14, 2014.

(51) Int. Cl.
| | |
|---|---|
| *H04M 11/00* | (2006.01) |
| *H04M 15/00* | (2006.01) |
| *H04L 12/14* | (2006.01) |
| *H04M 15/28* | (2006.01) |
| *H04M 15/02* | (2006.01) |
| *H04M 17/02* | (2006.01) |

(Continued)

(52) U.S. Cl.
CPC ........ *H04M 15/61* (2013.01); *H04L 12/1417* (2013.01); *H04L 12/1435* (2013.01); *H04L 12/1467* (2013.01); *H04M 15/28* (2013.01); *H04M 15/41* (2013.01); *H04M 15/8214* (2013.01); *H04M 15/83* (2013.01); *H04M 15/85* (2013.01); *H04M 15/853* (2013.01); *H04M 15/857* (2013.01); *H04M 15/88* (2013.01); *H04M 15/888* (2013.01); *H04M 17/02* (2013.01); *H04W 4/24* (2013.01); *H04W 88/08* (2013.01)

(58) Field of Classification Search
CPC .. H04M 2215/32; H04M 15/28; H04M 17/00; H04W 4/24; G06Q 20/32
See application file for complete search history.

(56) References Cited

U.S. PATENT DOCUMENTS

| | | | |
|---|---|---|---|
| 2012/0084187 A1 | 4/2012 | Sperling et al. | |
| 2013/0196618 A1* | 8/2013 | Zalmanovitch | H04W 24/02 455/405 |

(Continued)

*Primary Examiner* — Moustapha Diaby
(74) *Attorney, Agent, or Firm* — Baker Hostetler LLP

(57) ABSTRACT

The disclosure provides a system and method for metering on a prepaid wireless access point the amount of data transferred between a wireless device and the Internet and inhibiting further data transmission when the amount of prepaid data available reaches or drops below a pre-determined threshold. Specifically, the wireless access point includes a metering client to track one of data usage or an amount of prepaid data available. When the metering client indicates that the amount of data available has dropped below a pre-determined threshold, the wireless access point inhibits further data transmission.

20 Claims, 3 Drawing Sheets

(51) Int. Cl.
*H04W 4/24* (2018.01)
*H04W 88/08* (2009.01)

(56) References Cited

U.S. PATENT DOCUMENTS

2013/0305322 A1 11/2013 Raleigh
2015/0381824 A1 12/2015 Ting

\* cited by examiner

WIRELESS ACCESS POINT HAVING METERING CAPABILITY AND METERING DISPLAY

CROSS REFERENCE TO PRIOR APPLICATIONS

This application is a continuation of U.S. patent application Ser. No. 14/942,382, filed Nov. 16, 2015 now U.S. Pat. No. 9,736,320 issued Aug. 15, 2017, which is incorporated herein by reference in its entirety. This application also claims the benefit from U.S. Provisional Application No. 62/079,828 filed on Nov. 14, 2014, which is hereby incorporated by reference for all purposes as if fully set forth herein.

BACKGROUND OF THE DISCLOSURE

1. Field of the Disclosure

The disclosure generally relates to a system that meters an amount of wireless data, on a pre-determined basis, that is exchanged between a wireless network and one or more user devices via the system. Specifically, the disclosure relates to a wireless access point that enables one or more users to exchange a limited and metered amount of data with the network to which the wireless access point is connected.

2. Related Art

Mobile phones and other wireless devices are a popular means for people to connect to the Internet. Wireless devices can access the Internet through a wireless data plan for each wireless device or through a wireless access point, also known as a hotspot. The wireless access point allows one or more devices to access the Internet via a wireless network. The wireless access point may use a wireless communication protocol such as wireless fidelity (Wi-Fi) to connect to a Wi-Fi enabled device. The wireless access point subsequently utilizing a wireless communication protocol to connect to a wireless network in order to connect to the Internet. Such wireless access points are popular in homes, coffee shops, and other locations where a person is trying to access the Internet utilizing, for example, a Wi-Fi compatible device.

Currently, some wireless device users access the Internet through ongoing contracts with a Mobile Network Operator (MNO). In these postpaid plans, wireless device users can purchase a wireless access point and pay a substantial rate per month for data usage in order to have general Internet access via the wireless access point. However, extensive Internet access can result in extremely high costs for users. Moreover, these users are tied to long-term ongoing contracts with the MNO. Either one of these aspects can result in the user being subject to unforeseen expenses.

Alternatively, other users access wireless services through a "prepaid plan." Prepaid plans can be provided to users through a Mobile Virtual Network Operator (MVNO). An MVNO is a mobile operator that typically does not own its own frequency spectrum or have its own network infrastructure. Instead, the MVNOs have business arrangements and contracts with MNOs to purchase data usage of their networks.

In either case, prior network oversight of such wireless access points required extensive and complex tracking and control utilizing back end systems for example.

Accordingly, there is a need for a system and a process for providing a wireless access point that can provide, meter, and control prepaid wireless service along with informing the user of the information related to the same.

SUMMARY OF THE DISCLOSURE

The foregoing needs are met, to a great extent, by this disclosure, with a system and process for implementing a wireless access point connected to a mobile data network that meters the amount of data transferred between the wireless devices connected to the wireless access point and the mobile data network according to the amount of data a wireless access point user has purchased. Some users may benefit from such a system and method because the disclosure allows the users to limit and easily know the amount of money they spend accessing the Internet through a mobile data network. Additionally, other users may find it beneficial not to be locked into a long-term contract paying substantial fees per month.

In one or more aspects, a wireless access point includes a metering client configured to track at least one of data usage or an amount of prepaid data available, a first transceiver configured to transfer data between the wireless access point and a mobile network, a second transceiver to connect to at least one wireless device and to transfer data to and from the at least one wireless device, a computer readable medium configured to store the metering client, a processor configured to execute the metering client, and a display configured to display information from one of the computer readable medium, the processor, and the metering client, where the metering client adds to the amount of prepaid data available an amount of data a user purchases and subtracts from the amount of prepaid data available an amount of data a user uses and the display displays a remaining amount of data available.

In one or more aspects, a wireless access point includes means for tracking at least one of data usage or an amount of prepaid data available, means for transferring data between the wireless access point and a mobile network, means for connecting to at least one wireless device and to transfer data to and from the at least one wireless device, means for storing a metering client, means for tracking the at least one of data usage or the amount of prepaid data available, and means for displaying information from one of the means for storing and the means for tracking, where the means for tracking adds to the prepaid amount of data available an amount of data a user purchases and subtracts from the prepaid amount of data available an amount of data a user uses and the means for displaying displays information from one of the means for storing and the means for tracking at least one of data usage or the amount of prepaid data available.

In one or more aspects, a method of metering data usage on a wireless access point includes allocating a certain amount of data to a metering client based on an amount of data purchased by a user, displaying the amount of data remaining for use on a display of the wireless access point, monitoring the amount of data used by the wireless access point, deducting an amount of data users use with the wireless access point, updating the display with a new amount of data available for use by the wireless access point, and inhibiting data transfer between wireless devices and the wireless access point if the amount of data available reaches or drops below a pre-determined threshold.

MVNOs can offer prepaid data plans to their users in a variety of ways. One way is payment for a specific amount of data usage. For example, a user may pay $X upfront for Y MB of data usage for the user's wireless access point. The MVNO will then permit the user to access services until the subscriber payment is exhausted. This way, the service provider avoids nonpayment risks and the subscriber caps the total amount spent on network services. Another possible payment plan for prepaid data usage can be payment for a specified amount of time. For example, instead of paying for a fixed amount of data, a user could pay $W for Z minutes of Internet connection.

A prepaid wireless access point offers advantages that MNO wireless access points cannot. For example, MNOs frequently require their users to purchase long-term contracts, which prevent the users from changing their data plan if their circumstances change. Additionally, some users may not need all the data MNOs offer and thus these users pay for data they do not use. On the other hand, MVNOs may allow users to pay only for the amount of data they actually use, which can save users money. This potentially lower cost makes such technology available to a wider population. In addition to benefiting users, prepaid plans can benefit MNOs as well. The network performance is improved because data usage metering is at least partially performed on the wireless access point as described below rather than in the network. This increase in the performance of the MNO network may reduce the cost of operation.

There has thus been outlined, rather broadly, certain aspects of the disclosure in order that the detailed description thereof herein may be better understood and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Reference in this specification to a "wireless device" is intended to encompass any compatible computing device that can connect to a wireless access point, such as mobile phones, mobile equipment, mobile stations, user equipment, cellular phones, smartphones, handsets or the like (e.g., Apple iPhone, iPad, Google Android-based devices, BlackBerry-based devices, and other types of personal digital assistants or smartphones), wireless dongles, laptops, desktops, or other computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Further, reference in this specification to a "wireless network" or "network" is intended to encompass any type of wireless network from which an MVNO or an MNO uses to provide wireless data services to a wireless device utilizing a communication channel, such as the Global System for Mobile Communication (GSM) network, Code-Division Multiple Access (CDMA) network, Long Term Evolution (LTE), 5G (fifth generation), Evolution-Data Optimized (EVDO), or the like network utilizing a communication channel as defined herein or that may utilize the teachings of the present application to allow a wireless access point to connect to a network operator cloud.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
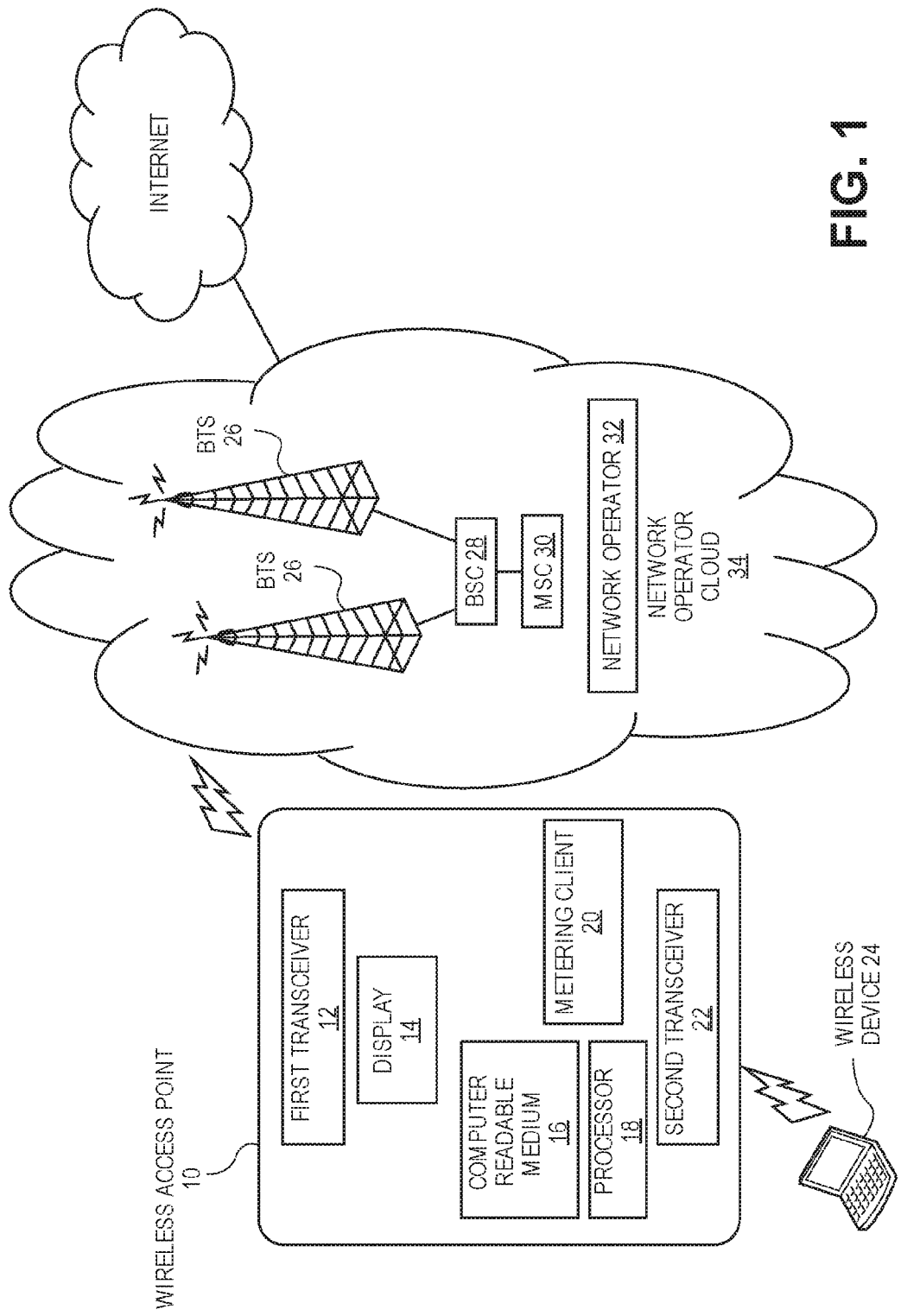
FIG. 1 shows the details of a network operator cloud, a wireless device, a wireless access point, and a metering client configured with the wireless access point according to an aspect of the disclosure.

FIG. 1 shows the details of a network operator cloud, a wireless device, a wireless access point, and a metering client configured with the wireless access point according to an aspect of the disclosure. In particular, FIG. 1 shows a wireless device 24, a wireless access point 10, and a network operator cloud 34. The wireless device 24 can be, for example, a cellular telephone, a laptop computer, a desktop computer, a tablet, a personal digital assistant, or any other device capable of wireless communication such as Wi-Fi wireless communication or other communication channel as defined herein.

The network operator cloud 34 may include a base transceiver station 26 (BTS), a base station controller 28 (BSC), and a mobile switching center 30 (MSC) overseen by a network operator 32. Other implementations of a wireless network operating on a communication channel as defined herein are contemplated.

The wireless access point 10 may include a first transceiver 12, a second transceiver 22, a display 14, a computer readable medium 16, a processor 18, and a metering client 20. The first transceiver 12 can include, for example, a wireless antenna and associated circuitry capable of data transmission with the mobile data network utilizing at least one data transmission protocol, such as, for example, 3G, 4G Long Term Evolution (LTE), 5G (fifth generation), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The first transceiver 12 transmits and receives data over the data transmission protocol with the network operator cloud 34.

The second transceiver 22 transmits to and receives data from the one or more wireless devices 24. The second transceiver 22 can include, for example, a wireless antenna and associated circuitry capable of data transmission over various data transmission protocols, such as, for example, Wi-Fi or some other communication channel as defined herein. The first transceiver 12 and the second transceiver 22 may be configured as separate devices or a single device. The first transceiver 12 and the second transceiver 22 may be configured as separate devices or a single device. The first transceiver 12, the second transceiver 22, and the processor 18 may be configured as separate devices or combined.

In one aspect of the disclosure, the second transceiver 22 may receive from one or more wireless devices 24, for example, a request to send data to the network operator cloud 34. The second transceiver 22 may receive this request in a modulated signal. The second transceiver 22 then may demodulate this signal for further processing within the wireless access point 10. The second transceiver 22 formats this message into a protocol appropriate for communication to the first transceiver 12. The first transceiver 12 receives this message and modulates the message for further wireless transmission to the network operator cloud 34. The first transceiver 12 formats the message into an appropriate format for transmission to the network operator cloud 34 using a network data transmission protocol as described above, such as, for example, 4G LTE.

In another aspect of the disclosure, the first transceiver 12 may receive data from the network operator cloud 34 with a destination for one of the wireless devices 24 connected to the wireless access point 10. The first transceiver 12 may demodulate the received message for further processing within the wireless access point 10 via, for example, a bus. The first transceiver 12 may format the message from the network operator cloud 34 into a format appropriate for transmission to the second transceiver 22. The second transceiver 22 may receive this message. The second transceiver 22 may modulate the received message for further wireless transmission to the wireless device 24. The second transceiver 22 may format the data into a format appropriate for transmission over the wireless protocol the wireless access point 10 is using, such as, for example, Wi-Fi, or some other communication channel as defined herein to communicate with the connected wireless devices 24.

The display 14 of the wireless access point 10 can be configured to display various information provided to the display 14 from the processor 18 of the wireless access point 10, computer readable medium 16, or metering client 20. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the amount of prepaid time available for using the wireless access point, the network connection strength, the type of mobile network data connection (such as 3G, 4G LTE, 5G, EVDO, etc.) the wireless access point is connected to, and/or other information potentially useful to the user. The information may be displayed simultaneously or the user may interact with an input device such as buttons on the wireless access point 10 or, if the display 14 is a touch-screen, with the icons on the display 14 to cycle through the various types of information for display. For example, the display 14 may display the amount of prepaid wireless data service available, the network connection strength, and the type of mobile network data connection simultaneously. Alternatively, the display 14 may only display one type of information, for example, the amount of prepaid wireless data service available, at a time. The display 14 may then display other types of information if the user interacts with buttons on the wireless access point 10 or, if the display is a touch-screen, with icons on the display 14.

The computer readable medium 16 may be configured to store the metering client 20. For the purposes of this disclosure, the computer readable medium 16 stores computer data, which can include computer program code that is executable by the processor 18 of the wireless access point 10, in machine readable form. By way of example, and not limitation, the computer readable medium 16 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product. The computer readable medium 16 may also be configured to store the values for the amount of wireless data service available, the amount of wireless data service used, how many days of wireless service have been used, how many days of wireless service remain, and the like. The computer readable medium 16 may also store how much data was used for each domain, web address, wireless device application, or other web resource during a given time period, such as, for example, one billing cycle.

Additionally, the processor 18 executing the computer readable medium 16 may communicate to or display on the display 14 the various metrics described above. For example, the processor 18 executing the computer readable medium 16 may communicate to or display on the display 14 the amount of wireless data service used, the amount of wireless data service remaining, how many days of wireless service have been used, how many days of wireless service remaining, and the like. Similarly, the processor 18 executing the computer readable medium 16 may also communicate to or display on the display 14 the amount of data sent and received. Moreover, the processor 18 executing the computer readable medium 16 may communicate to or display on the display 14 the amount of data that may be remaining from the previously purchased and/or credited amount of data.

The processor 18 may be configured to execute the metering client 20. The processor 18 can be, for example, dedicated hardware as defined herein, a computing device as defined herein, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

Additionally, the processor 18 may communicate to or display on the display 14 the various metrics described above. For example, the processor 18 may communicate to or display on the display 14 the amount of data used. Similarly, the processor 18 may also communicate to or display on the display 14 the amount of data sent and received. Moreover, the processor 18 may communicate to or display on the display 14 the amount of data that may be remaining from the previously purchased and/or credited amount of data.

The metering client 20 may be hardware or a software application configured to track prepaid data usage and the remaining amount of prepaid data available. The metering client 20 may be written in any programming language, such as, for example, C, Java, Objective-C, C#, Python, Visual Basic, Perl, or any other programming language the processor 18 is capable of executing. The metering client 20 may also meter how much data has been used on a given domain, web address, wireless device application, or other web resource.

Additionally, the metering client 20 may communicate to or display on the display 14 the various metrics described above. For example, the metering client 20 may communicate to or display on the display 14 the amount of data used. Similarly, the metering client 20 may also communicate to or display on the display 14 the amount of data sent and received. Moreover, the metering client 20 may communicate to or display on the display 14 the amount of data that may be remaining from the previously purchased and/or credited amount of data.

A user can increase the amount of data available by sending a message with a code evidencing payment of wireless service, such as, for example, via a short message service (SMS) text message. This message can be sent in various ways. One such way is to input the code directly into the wireless access point 10. Another way is by accessing a website to pay for wireless data service. These examples are merely illustrative and not limiting. Other means of sending the message, such as, for example, electronic mail providing the code to increase the amount of wireless data service available for use is envisioned by the disclosure.

In a particular aspect of the application, the processor 18 executing the computer readable medium 16 of wireless access point 10 includes the metering client 20. The metering client 20 may be configured to control use of the wireless access point 10 based on interaction with a server, the server provisioning wireless service to the user, or the like. The metering client 20 may utilize an internal accounting module to establish an account with a representation of prepaid funds or available credit for wireless services. The internal accounting module may also store a plurality of charge rates and may also store a billing algorithm. The internal accounting module can classify each wireless service (data, voice, SMS) into one of a plurality of billing categories; select a charge rate corresponding to that billing category; calculate an appropriate charge for the data usage, voice usage, and SMS usage in real time by using the selected charge rate; and apply this appropriate charge to the account. Once the internal accounting module determines that the amount of wireless service (data, voice, SMS) used has depleted the account zero, the internal accounting module may interact with the processor 18 to limit, prevent, or control further use of the wireless access point 10 as described herein. The controlled use including suspending wireless data service, limiting wireless data service, throttling wireless data service, and allowing all wireless data service. In this aspect, the data management application may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a particular wireless device or its user, the host processor may be capable of ascertaining the operating codes needed to activate that particular wireless device or needed to set its account amount. Further details of this aspect of the metering client 20 are described in U.S. Pat. No. 6,650,887, to McGregor, et al., filed Nov. 18, 2003 and incorporated by reference herein in its entirety.

Figure 2:
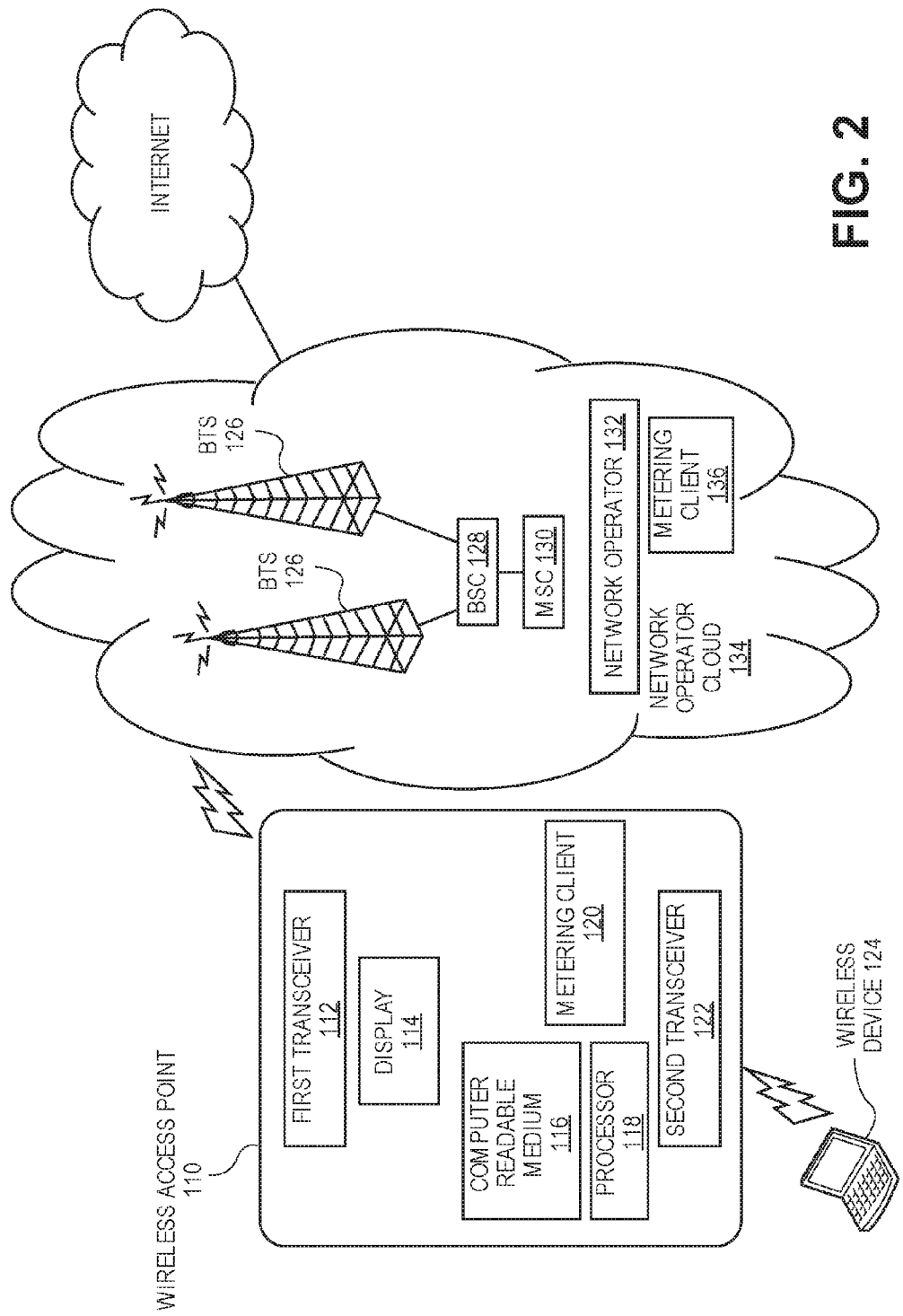
FIG. 2 shows the details of a network operator cloud, a wireless device, a wireless access point, and a metering client configured with the wireless access point and the network operator cloud according to another aspect of the disclosure.

FIG. 2 shows the details of a network operator cloud, a wireless device, a wireless access point, and a metering client configured with the wireless access point and the network operator cloud according to another aspect of the disclosure. In particular, FIG. 2 shows a wireless device 124, a wireless access point 110, and a network operator cloud 134, and a metering client located partially within the wireless access point 110 and partially within the network operator cloud 134. In one aspect of the disclosure, the metering client may reside on both the wireless access point 110 and the network operator cloud 134.

The wireless access point 110 includes a first transceiver 112, a second transceiver 122, a display 114, a computer readable medium 116, a processor 118, and a metering client 120. The first transceiver 112 can include, for example, a wireless antenna and associated circuitry capable of data transmission with the mobile data network utilizing at least one data transmission protocol, such as, for example, 3G, 4G Long Term Evolution (LTE), 5G (fifth generation), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The first transceiver 112 transmits and receives data over the data transmission protocol with the network operator cloud 134.

This configuration of the metering client achieves the same function as the configuration of the metering client residing completely on the wireless access point 10. The difference between the two configurations is the location in which some of the functions of the metering client may take place. For example, the metering client in the network operator cloud 134 may compute the amount of data used and send that amount to the metering client on the wireless access point 110. The processor 118 would then deduct from the total amount of data available for users the amount of data used as computed by the metering client in the network operator cloud 134. This is only one possible aspect of the different functions the two metering clients 120, 136 may perform. Other functions and division of functions between the two metering clients 120, 136 are possible.

The network operator cloud 134 may include a base transceiver station 126 (BTS), a base station controller 128 (BSC), a mobile switching center 130 (MSC) overseen by a network operator 132. Other implementations of a wireless network are contemplated as well such as a CDMA-based network.

The particular aspect, the metering client 120 may be implemented in conjunction with a metering client that may be implemented as a process capable of tracking usage of a wireless access point 110 in a wireless network with a metering system implemented in a network operator cloud and a tracking system implemented in the wireless access point 110. The metering client 120 may be capable of activating the wireless access point 110 in response to identification of the wireless device and confirmation of use of a tracking system to the metering system. The metering client may be further configured to obtain by the metering system, an amount of wireless services (data, voice, SMS) used by the wireless device; wherein the obtaining includes at least one of obtaining an amount of wireless services used from the third party wireless network and obtaining an amount of wireless services used from the tracking system. With this information, the metering client 120, 136 can interact with the processor 118 to control use of wireless access point 110. The controlled use including suspending wireless data service, limiting wireless data service, throttling wireless data service, and allowing all wireless data service. Further details of this aspect of the metering client are described in U.S. patent application Ser. No. 13/669,838, filed Nov. 6, 2012 and incorporated by reference herein in its entirety. This data management application also allows the user to manage settings and functions of various applications on their wireless access point 110.

Figure 3:
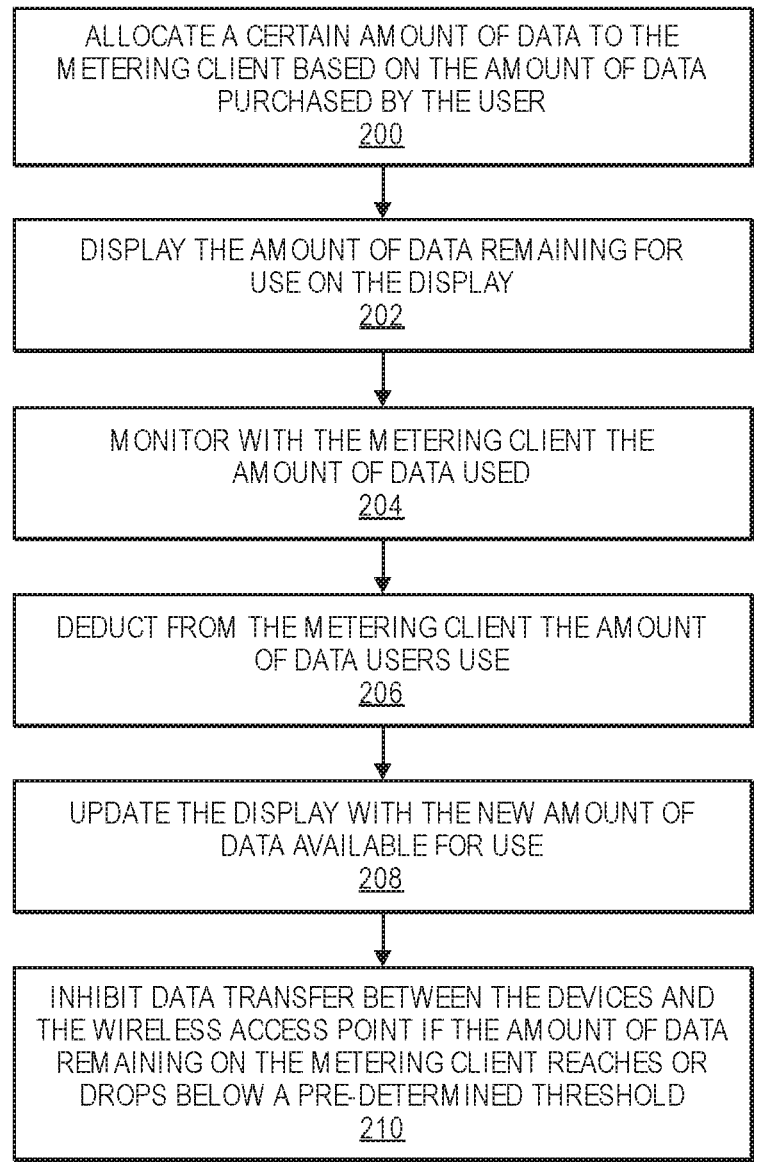
FIG. 3 shows a method of how a wireless access point meters the amount of data transferred between one or more wireless devices connected to the wireless access point and the network operator cloud according to yet another aspect of the disclosure.

FIG. 3 shows a flowchart detailing the method of how a wireless access point meters the amount of data transferred between one or more wireless devices connected to the wireless access point and the network operator cloud according to yet another aspect of the disclosure. In particular, FIG. 3 shows a method of metering data usage on a wireless access point. In Step 200, the wireless access point may allocate a certain amount of data to the metering client. The allocation may be determined by how much previously allocated data is still available and then adding to that amount the amount of data purchased by a user. In Step 202, the wireless access point may display the total amount of allocated data on its display so that the user knows how much data is available for use and whether to purchase more data. In Step 204, while using the wireless access point, the metering client may monitor how much of the allocated data has been used by the computing devices connected to the wireless access point. In Step 206, the metering client may deduct from the total amount of allocated data available the amount of data used by the computing devices connected to the wireless access point. In Step 208, the display may update and display the new remaining amount of data available for use. In Step 210, once the amount of data available for use reaches or drops below a pre-determined threshold, the wireless access point may inhibit data transfer between the devices and the wireless access point.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless access point comprising:
a metering client implemented in the wireless access point, the metering client configured to track at least prepaid data usage and an amount of prepaid data available;
a first transceiver configured to transfer data between the wireless access point and a mobile network;
a second transceiver to connect to at least one wireless device and to transfer data to and from the at least one wireless device;
a computer readable medium configured to store the metering client;
a processor configured to execute the metering client;
a display implemented in the wireless access point, the display configured to display information from one of the computer readable medium, the processor, and the metering client;
the metering client is further configured to determine the amount of prepaid data available and an amount of data a user uses; and
the display implemented in the wireless access point is further configured to receive a remaining amount of data available from the processor and display the remaining amount of data available.

2. The wireless access point of claim 1, wherein the metering client is configured to track prepaid data usage and the amount of prepaid data available with an internal accounting module.

3. The wireless access point of claim 1, wherein the metering client is further configured to track the amount of prepaid data used on a given domain, web address, wireless device application, or other web resource with an internal accounting module.

4. The wireless access point of claim 1, wherein the computer readable medium is further configured to store values for the amount of prepaid data available, how much time remains until the user must add additional prepaid data, and how much prepaid data was used for each domain, web address, wireless device application, or other web resource during a specified time period with an internal accounting module.

5. The wireless access point of claim 1, wherein the metering client is further configured to store values for the amount of prepaid data available, how many days are left until the user must add additional data or time to the wireless access point, and how much prepaid data was used for each domain, web address, wireless device application, or other web resource during a given time period with an internal accounting module.

6. The wireless access point of claim 1,
wherein the metering client is further configured to meter the amount of prepaid data sent and received; and
wherein the metering client is further configured to prevent further use of the wireless access point when there is no more remaining available prepaid data.

7. The wireless access point of claim 1, wherein the display is a touch-screen display.

8. The wireless access point of claim 1 further comprising at least one input device to change the information the display is displaying.

9. The wireless access point of claim 1, wherein the display is configured to display the amount of prepaid data available, an amount of prepaid time available, a network connection strength, and a type of mobile network data connection.

10. A wireless access point, comprising:
means for tracking implemented in a processor of the wireless access point, the means for tracking tracks at least prepaid data usage and an amount of prepaid data available;
means for transferring data between the wireless access point and a mobile network;
means for connecting to at least one wireless device and to transfer data to and from the at least one wireless device;
means for implementing a metering client in the processor;
means for tracking at least the prepaid data usage and the amount of prepaid data available;
means for displaying implemented in a display of the wireless access point, the means for displaying displays information from one of a means for storing and the means for tracking; and
the means for displaying implemented in the wireless access point further receives information from one of the means for implementing and the means for tracking at least one of the prepaid data usage or the amount of prepaid data available and displays at least one of data usage or the amount of prepaid data available on the display.

11. The wireless access point of claim 10, wherein the means for tracking is configured to track prepaid data usage and the amount of prepaid data available with an internal accounting module.

12. The wireless access point of claim 10, wherein the means for tracking is further configured to track the amount of prepaid data used on a given domain, web address, wireless device application, and other web resource with an internal accounting module.

13. The wireless access point of claim 10, wherein the means for storing is further configured to store values for the amount of prepaid data available, how much time remains until the user must add additional data, and how much prepaid data was used for each domain, web address, wireless device application, or other web resource during a specified time period with an internal accounting module.

14. The wireless access point of claim 10, wherein the means for tracking is further configured to store values for the amount of prepaid data available, how many days are left until the user must add additional prepaid data or time to the wireless access point, and how much prepaid data was used for each domain, web address, wireless device application, or other web resource during a given time period with an internal accounting module.

15. The wireless access point of claim 10,
wherein the means for tracking is further configured to meter the amount of prepaid data sent and received; and
wherein the means for tracking is further configured to prevent further use of the wireless access point when there is no more remaining available prepaid data.

16. The wireless access point of claim 10, wherein the means for displaying is further configured to display the amount of prepaid data available, an amount of prepaid time available, a network connection strength, and a type of mobile network data connection.

17. A method of metering data usage on a wireless access point comprising:
allocating a certain amount of prepaid data to a metering client implemented in the wireless access point based on an amount of prepaid data purchased by a user;
displaying the amount of prepaid data remaining for use on a display of the wireless access point;
monitoring an amount of data used by the wireless access point with a metering client implemented by a processor;
providing the display with a new amount of data available with the processor implementing the metering client for use by the wireless access point;
displaying on the display of the wireless access point the new amount of data available; and
inhibiting data transfer between wireless devices and the wireless access point if the amount of data available reaches or drops below a pre-determined threshold.

18. The method of metering data usage on a wireless access point of claim 17, further comprising tracking prepaid data usage and the amount of prepaid data available with an internal accounting module.

19. The method of metering data usage on a wireless access point of claim 17, further comprising tracking the amount of prepaid data used on a given domain, web address, wireless device application, and other web resource with an internal accounting module.

20. The method of metering data usage on a wireless access point of claim 17, further comprising storing the amount of prepaid data available, how much time remains until the user must add additional data, and how much prepaid data was used for each domain, web address, wireless device application, or other web resource during a specified time period with an internal accounting module.

* * * * *